US008456463B2

(12) United States Patent
Bandyopadhyay et al.

(10) Patent No.: US 8,456,463 B2
(45) Date of Patent: Jun. 4, 2013

(54) LOW VOLTAGE DRIVER FOR HIGH VOLTAGE LCD

(75) Inventors: Abhishek Bandyopadhyay, Woburn, MA (US); Eric Nestler, Harvard, MA (US); Michael A. Ashburn, Jr., Groton, MA (US)

(73) Assignee: Analog Devices, Inc., Norwood, MA (US)

( * ) Notice: Subject to any disclaimer, the term of this patent is extended or adjusted under 35 U.S.C. 154(b) by 1046 days.

(21) Appl. No.: 11/904,931

(22) Filed: Sep. 28, 2007

(65) Prior Publication Data

US 2008/0079708 A1 Apr. 3, 2008

Related U.S. Application Data

(60) Provisional application No. 60/848,908, filed on Oct. 3, 2006.

(51) Int. Cl.

| | |
|---|---|
| ***G06F 3/038*** | (2006.01) |
| ***G09G 5/00*** | (2006.01) |
| ***G09G 3/32*** | (2006.01) |
| *G09G 3/36* | (2006.01) |

(52) U.S. Cl.
CPC ............ *G09G 3/3233* (2013.01); *G09G 3/3696* (2013.01)
USPC ............................ 345/212; 345/204; 345/211

(58) Field of Classification Search
None
See application file for complete search history.

(56) References Cited

U.S. PATENT DOCUMENTS

| | | | | |
|---|---|---|---|---|
| 4,150,308 | A | 4/1979 | Adlhock | |
| 4,161,663 | A | 7/1979 | Martinez | |
| 5,243,236 | A | 9/1993 | McDaniel | |
| 5,465,054 | A | 11/1995 | Erhart | |
| 5,821,800 | A | 10/1998 | Le et al. | |
| 5,973,660 | A * | 10/1999 | Hashimoto | 345/98 |
| 6,225,992 | B1 * | 5/2001 | Hsu et al. | 345/211 |
| 6,229,290 | B1 * | 5/2001 | Nguyen et al. | 323/268 |
| 6,373,419 | B1 * | 4/2002 | Nakao | 341/154 |
| 6,518,946 | B2 * | 2/2003 | Ode et al. | 345/98 |
| 6,573,878 | B1 * | 6/2003 | Mizobata | 345/60 |
| 2002/0090034 | A1 * | 7/2002 | Lu | 375/257 |

* cited by examiner

*Primary Examiner* — Sumati Lefkowitz
*Assistant Examiner* — Jesus Hernandez
(74) *Attorney, Agent, or Firm* — Kenyon & Kenyon LLP

(57) ABSTRACT

A low voltage driver for a higher voltage LCD includes a plurality of LCD drive bias voltage input-terminals; an LCD drive voltage output terminal; an input transistor switching circuit having at least one switch for each LCD drive bias voltage for selecting one of the bias voltages; an output transistor switching circuit, responsive to the input transistor switching circuit, for applying the selected one of the bias voltages to the LCD drive voltage output terminal, the transistors of the switching circuits having a predetermined breakdown voltage; a level shifter for providing switching voltages counterpart to the plurality of bias voltages; a logic circuit for enabling the first transistor switching circuit to select a one of the bias voltages and applying a set of counterpart switching voltages to the input and output transistor switching circuits for connecting the selected one of the bias voltages to the output terminal and applying a set of switching voltages to the input and output switching circuits which limit the voltage across the transistor junctions in the switching circuit to less than the predetermined breakdown voltage.

13 Claims, 7 Drawing Sheets

LOW VOLTAGE DRIVER FOR HIGH VOLTAGE LCD

RELATED APPLICATIONS

This application claims benefit of and priority to U.S. Provisional Application Ser. No. 60/848,908 filed Oct. 3, 2006 incorporated herein by this reference.

FIELD OF THE INVENTION

This invention relates to a low voltage driver for a high voltage LCD.

BACKGROUND OF THE INVENTION

Twisted Nematic (TN) type or Super Twisted Nematic (STN) type liquid crystal displays (LCDs) are the types of displays used in watches and other common low cost monochromatic displays like energy meters. These displays are described as root mean square (RMS) responsive meaning the behavior is a function of the RMS voltage applied. The fundamental affect on the light is to rotate polarized light as it passes through the liquid crystal fluid. The amount of twist is controlled by the RMS voltage applied For twisted nematic LCDs the driver a.c. segment waveforms are constructed by predetermined timed combinations of voltage levels of e.g. half bias GND: ½:1 or one third bias GND: ⅓:⅔:1. Typically LCD drivers have been essentially multiplexers that switch an output pin connected to an LCD display between several analog voltage levels. These voltages are typically constrained to be at or below the power supply voltage of the device. The contrast on these LCDs panels depends on the RMS voltage of the waveforms applied to the pins. A 5V supply seems to be a lower level that the LCD manufacturers can design displays for with reasonable display layout complexity and cost. For CMOS processes with feature size less than 0.25 μm, 5V tolerant devices are not available for normal digital processes, and one would have to avail of the expensive 5V tolerant option to drive these panels. For the normal digital process the supply voltage is typically less than 3.6V and hence the amplitude of the output waveforms are limited by this voltage. This would imply that for certain LCD panels the RMS voltages seen by the panel might not be large enough for good contrast across the temperature range dictated by the application (−40 C −85 C). Since the required RMS voltage, for reasonable contrast, increases with decreasing temperature, even for 3-3.6V LCD panels the RMS voltage might not be enough for proper contrast at cold temperatures, if driven from a 3.6V supply.

BRIEF SUMMARY OF THE INVENTION

It is therefore an object of this invention to provide a new and improved low voltage driver for a higher voltage LCD.

It is a further object of this invention to provide such a low voltage driver for a higher voltage LCD which can employ low voltage drivers to provide high voltage operation.

It is a further object of this invention to provide such a low voltage driver for a higher voltage LCD which is less expensive, and requires less chip area and less power.

The invention results from the realization that an improved low voltage driver for a high voltage LCD can be achieved with an input transistor switching circuit having at least one switch for each LCD drive bias voltage for selecting one of those bias voltages; an output transistor switching circuit responsive to the input switching circuit for applying the selected one of the bias voltages to an LCD drive voltage terminal; a level shifter for providing the counterpart switching voltages for the plurality of bias voltages and a logic circuit for enabling the first transistor switching circuit to select a one of the bias voltages and applying a set of counterpart switching voltages to the input-and output transistor switching circuits for connecting the selected one of the bias voltages to the output terminal and applying a set of switching voltages to the input and output switching circuits which limit the voltage across the transistor junctions in the switching circuits to less than the predetermined breakdown voltage.

The subject invention, however, in other embodiments, need not achieve all these objectives and the claims hereof should not be limited to structures or methods capable of achieving these objectives.

This invention features a low voltage driver for a higher voltage LCD including a plurality of LCD drive bias voltages input terminals and an LCD drive voltage output terminal. An input transistor switching circuit has at least one switch for each LCD drive bias voltage for selecting one of the bias voltages and an output transistor switching circuit is responsive to the input transistor switching circuit, for applying the selected one of the bias voltages to the LCD drive voltage output terminal. The transistors of the switching circuits have a predetermined breakdown voltage. A level shifter provides switching voltages counterpart to the plurality of bias voltages and a logic circuit enables the first transistor switching circuit to select a one of the bias voltages and applying a set of counterpart switching voltages to the input and output transistor switching circuits for connecting the selected one of the bias voltages to the output terminal and applying a set of switching voltages to the input and output switching circuits which limit the voltage across the transistor junctions in the switching circuit to less than the predetermined breakdown voltage.

In a preferred embodiment the level shifter may include a PMOS switch, an NMOS switch and a clamp circuit for clamping the PMOS switch gates above ground. The clamp circuit may be active clamp. The PMOS switch may be cross coupled to the NMOS switch. The input switching circuit may include at least a first input transistor switch for each bias voltage input terminal. The output switching circuit may include at least a first output transistor switch for each pair of first input transistor switches. At least a first pair of first input transistor switches may be PMOS transistors and there may be a blocking transistor in series with each of the first input PMOS transistor switches for enabling start-up with the bias voltages below a preset voltage. The counterpart switching voltages may be approximately equal to the bias voltages. There may be a monitor safety mode circuit for determining whether the driver should be in the higher voltage protected mode or the unprotected mode.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
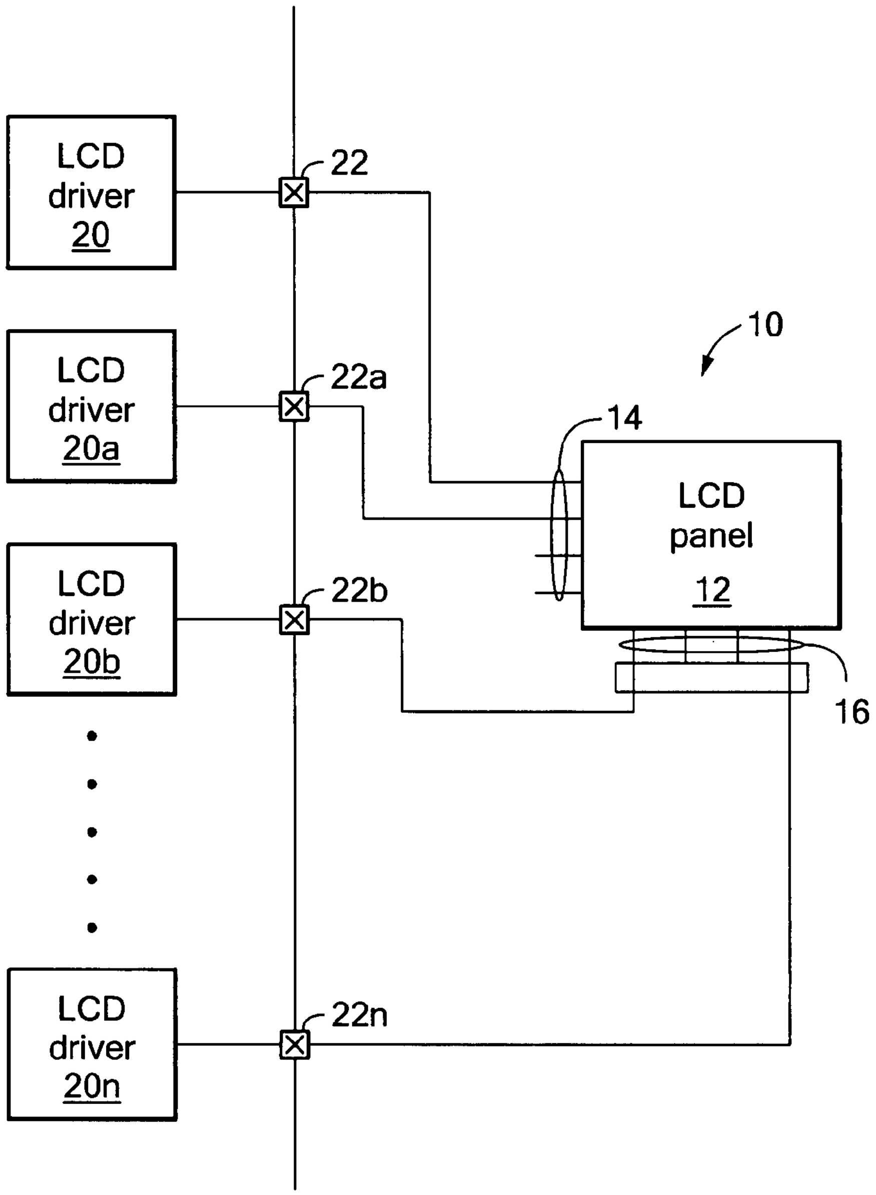
FIG. 1 is a schematic block diagram of an LCD and associated LCD drivers according to this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1 an LCD 10 including LCD panel 12 with common contacts 14 and segment contacts 16 and a number of LCD drivers 20, 20*a*, 20*b* . . . 20*n*, each of which provides a drive signal on its associated output 22, 22*a*, 22*b* . . . 22*n* to a one of the common contacts 14 and segment contacts 16.

Figure 2:
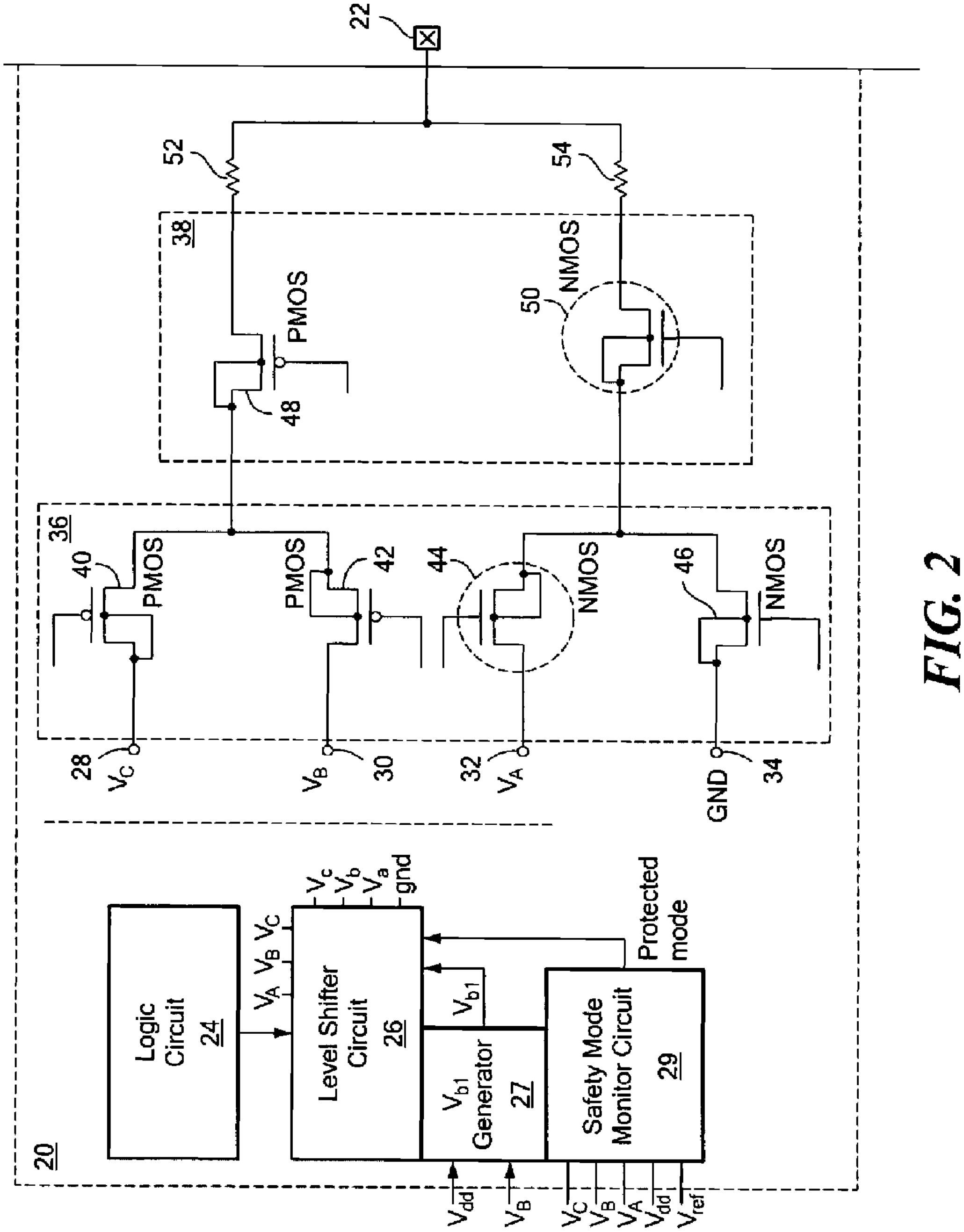
FIG. 2 is a more detailed schematic diagram of one embodiment of the LCD driver of FIG. 1.
Figure 2A:
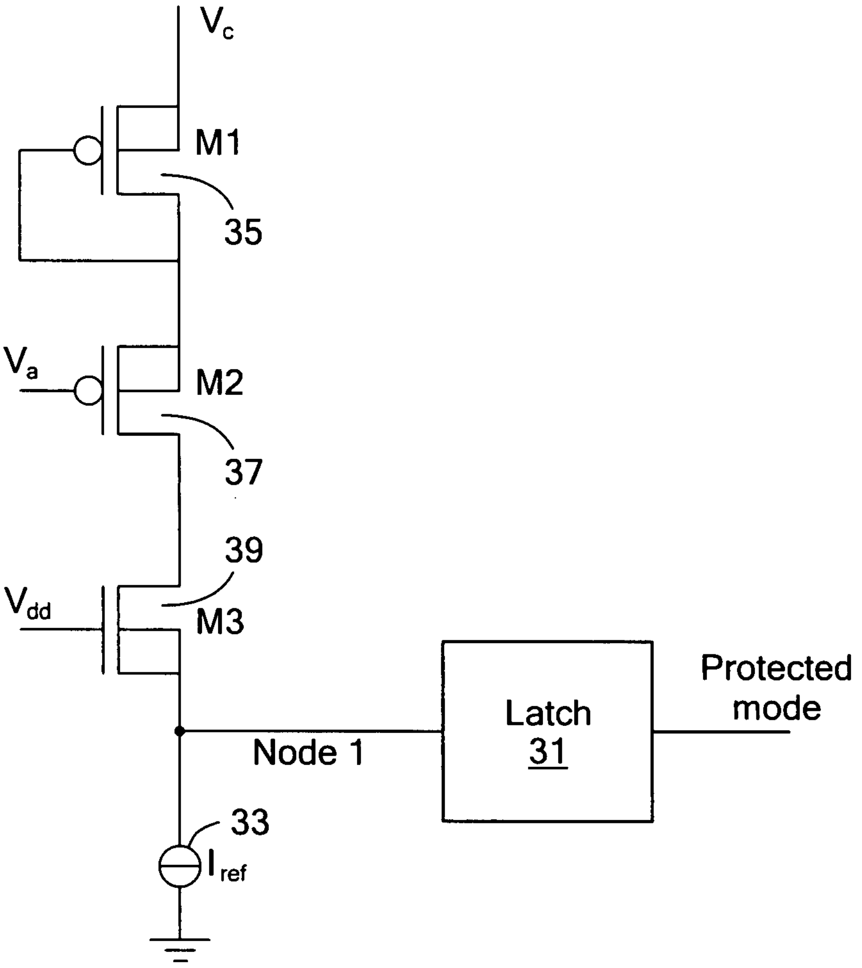
FIG. 2A is a more detailed diagram of the VC monitor/safety mode circuit of FIG. 2.

Each driver exemplified by driver 20, FIG. 2, according to this invention, includes combination logic for the drivers in driver circuit 24 and a level shifter circuit 26. Level shifter circuit 26 contains a level shifter for each transistor switch 40, 42, 44, 46, 48, and 50. There are a plurality of bias voltage input terminals $V_C$, 28; $V_B$, 30; $V_A$ 32; and GND 34. Also included is an input transistor switching circuit 36 and output transistor switching circuit 38. Bias voltages $V_C$, $V_B$, $V_A$, and GND maybe supplied from an external source or may be provided by an on-chip charge pump. Level shifter circuit 26 also may provide counterpart switching voltages $V_a$, $V_b$, $V_c$ if desired. These are counterparts of the bias voltages $V_C$, $V_B$, $V_A$ and can be derived directly therefrom. Level shifter circuit 26 also includes $V_{bl}$ generator 27, which may be simply a comparator that compares the power supply voltage $V_{dd}$ with the counterpart switching voltage Vb and provides the greater of the two as the voltage $V_{bl}$ so that level shifter circuit 26 provides $V_c$, $V_{bl}$, $V_a$, and gnd. The Vc monitor/safety mode circuit 29 is used to determine whether the LCD driver should be in the higher voltage protected mode or not. The module is put into the "protected" mode if the value of Vc is more than a predetermined threshold voltage. This mode ensures that none of the transistors have a Vgs and Vgd more than a predetermined voltage under all conditions to ensure long term reliability. For this mode to work special protection circuits are enabled in the level shifter circuits and these only work for Vc voltages more than a certain value due to headroom issues. For operation for Vc voltages less than that value the special circuits in the level shifter circuits 26 are turned off such that headroom is not an issue anymore and the LCD functions like any other normal logic and is said to perform in the "non-protected" mode. $V_c$ monitor/safety mode circuit 29, FIG. 2A, includes latch 31, circuit source 33 and threshold circuits 35, 37, 39. If the difference between $V_C$ and $V_A$ is less than a threshold voltage then node 1 is digital low, driven to ground by fref, and the module works in the ion-protected mode. This threshold voltage is set by the sizes of transistors 35 and 37. If $V_C$ is more than $V_A$ by a threshold voltage then current starts flowing through the upper leg. The value of this current depends on the difference between $V_A$ and $V_C$ and when that current is greater than Ire then node 1 is a digital high. This value captured by latch 31 and in this situation the module is run in the "protected" mode. Input transistor switching circuit 36 may include at least one switch 40, 42, 44, 46 for each bias voltage at each bias voltage input terminal $V_C$, 28; $V_B$, 30; $V_A$, 32; and GND 34, respectively. Output transistor switching circuit 38 may include a switching circuit associated with each of the switching circuits 40, 42, 44, 46 of input transistor switching circuit 36, or as shown in the embodiment of FIG. 2, there may be but one switch 48, 50 associated with each pair of switches 40, 42, 44, 46 and input transistor switching circuit 36. There may also be limiting resistors 52, 54. Switches 40, 42, 48 are implemented in FIG. 2 with PMOS transistors as shown with their back gates connected to the one of the source or drains which is the higher voltage. Switches 44, 46, and 50 in contrast are NMOS transistors whose back gates are connected either to ground or to the lower voltage one of the drain and source as shown. PMOS transistors are maintained in the off condition when the gate voltage is equal to or higher than the source voltage, otherwise they are on. NMOS transistors in contrast are on when the gate voltage is equal to or higher than the source voltage otherwise they are off.

In operation logic circuit 24 performs one function as in the prior art, that of constructing the AC segment wave forms for the LCD by constructing predetermined timed combinations of voltage levels, e.g. half bias or one third bias using combinations of $V_C$, $V_B$, $V_A$, GND. But in accordance with this invention it also directs the level shifters in level shifter circuit 26 to provide the counterpart switching voltages $V_c$, $V_b$, $V_a$, and gnd of PMOS transistors 40, 42, and 48 and NMOS transistors 44, 46, and 50 in combinations that both turn them on and off appropriately to obtain the correct sequence of voltages at output terminal 22 and also apply the gating voltages in such a way that the breakdown voltage of the transistors is never exceeded. For example, with a 3.3 voltage CMOS process transistors have a breakdown voltage of around 4 volts and so that voltage can never be exceeded across any junction of the transistors.

In order to operate the LCD with an LCD drive voltage on LCD output terminal 22 of 5.5 volts, for example, using PMOS and CMOS transistors made with a common, less expensive 3.3 volt process in accordance with this invention, the gates of each of the transistors 40-50 is operated to turn off or turn on the associated transistor without exceeding a safe, for example, 4 volt breakdown voltage across any junction. Since the value of the voltage Vc is large and exceeds the breakdown voltage the LCD module is operated in the protected mode. For example, supposing it is selected to provide bias voltage, Vc 28 to output terminal 22, this requires that PMOS transistor 40 be turned on and also transistor 48. In this example $V_A$, $V_B$ and $V_c$, are, for example, 2 volts, 4 volts, and 6 volts. If then $V_c$ at 28 is called to be applied to the output terminal 22, transistor 40 must be turned on by a voltage at its gate. Typically that could be ground but that would produce a 6 volt drop from source to drain which would exceed the breakdown voltage, so instead that gate is provided with $V_a$, 2 volts. Now transistor 48 must also be on but since there are 6 volts at its source it could not tolerate a ground on its gate to turn it on either and so $V_a$, is also applied there. Nominally 6 volts now appears at terminal 22, this means that there is approximately 6 volts on transistor 50. Since this is an NMOS transistor, ground on its gate would keep it off. But in this case in order to protect the junction a voltage Va is applied to the gate and transistor 44 is turned on such that the source of transistor 50 has Va applied to it. In essence the transistor 50 is turned off by applying Va to its gate and thus Vgs equal to 0V. In this way logic circuit 24 according to this invention operates level shifter circuit 26 to provide the proper on/off command to the various transistors yet uses gate voltage levels which will prevent the breakdown voltage from being exceeded.

A chart showing state of the different transistors while in protected mode, is shown in Table I.

TABLE I

| | 40 | 42 | 48 | 44 | 46 | 50 | 60 | 62 |
|---|---|---|---|---|---|---|---|---|
| $V_C$ On | On | Off | On | On | Off | Off | On | Off |
| | $V_a$ | $V_C$ | $V_a$ | Vb1 | gnd | $V_a$ | $V_a$ | Vdd |
| $V_B$ On | Off | On | On | On | Off | Off | Off | On |
| | $V_C$ | $V_a$ | $V_a$ | Vb1 | gnd | $V_a$ | Vdd | $V_a$ |
| $V_A$ On | Off | On | Off | On | Off | On | Off | On |
| | $V_C$ | $V_a$ | Vb1 | Vb1 | gnd | Vb1 | Vdd | $V_a$ |
| GND | Off | On | Off | Off | On | On | Off | On |
| On | $V_C$ | $V_a$ | Vb1 | gnd | Vb1 | Vb1 | Vdd | $V_a$ |

The first six items in the top line identify the six transistors 40, 42, 48, 44, 46 and 50. The items in the left hand column identify the on condition for the drive bias voltage $V_C$, $V_B$, $V_A$, and GND. In each box the top entry indicates the condition of that transistor, on/off, for the particular state of the LCD output voltage, $V_C$, $V_B$, $V_A$, or GND. The lower entry in each box represents the voltage that is applied to the gate of that transistor to effect the selection of that bias voltage $V_C$, $V_B$, $V_A$, GND while avoiding exceeding the breakdown voltage. The voltage on the gates may be $V_c$, $V_{bl}$, $V_a$, and gnd. Table I represents one set of conditions, for example, for a one third bias. For a one-half bias the $V_B$ on row would be omitted and similar patterns of switching and gate levels would be used.

In the unprotected mode the transistors are operated as if they are normal switches and the level shifters provide the voltages at the gates of the driver transistors as if they were normal digital switches. This mode ensures that the LCD driver can operate at low voltages of Vc, Vb, and Va. In this mode to turn on a PMOS transistor or to turn off a NMOS transistor a ground is applied to the corresponding gate terminal.

A chart showing state of the different transistors while in non-protected mode is shown in Table II.

TABLE II

| | 40 | 42 | 48 | 44 | 46 | 50 | 60 | 62 |
|---|---|---|---|---|---|---|---|---|
| $V_C$ On | On | Off | On | On | Off | Off | On | Off |
| | gnd | $V_C$ | gnd | Vb1 | gnd | gnd | gnd | Vdd |
| $V_B$ On | Off | On | On | On | Off | Off | Off | On |
| | $V_C$ | gnd | gnd | Vb1 | gnd | gnd | Vdd | gnd |
| $V_A$ On | Off | On | Off | On | Off | On | Off | On |
| | $V_C$ | gnd | Vb1 | Vb1 | gnd | Vb1 | Vdd | gnd |
| GND | Off | On | Off | Off | On | On | Off | On |
| On | $V_C$ | gnd | Vb1 | gnd | Vb1 | Vb1 | Vdd | gnd |

At start up or in other conditions where there may be no voltage VC at terminal 28 all of the PMOS transistors, 40, 42, 48 might be conducting if there is a stray voltage on the output terminal 22 which is higher then the gates of transistors 40, 42, and 48. In this situation there would also be a direct short between the terminals 28, 30, 32 and 34. To address this problem of shutting off the leakage paths blocking switches or transistors 60, 62, may be added to switching circuit 36*a*, FIG. 3. Then independent of whether the VC voltage level is present and independent of the voltage that may be on output terminal 22, the driver can be shutoff without damaging the LCD connected to the output terminal 22 and also the internal transistors. For turning off the leakage paths the idea is to have something in the path which can be used to shut off the path for current flow. There is no such problem with respect to transistors 44 and 46 for they are not PMOS, they are NMOS and they would be turned off since the gates would be at ground. The transistors 60 and 62 are turned on as needed by applying Va (protected mode) or ground (non-protected mode). The supply voltage Vdd is applied to the gate when these are supposed to be off. The transistors 60 and 40 are connected such that when Vc is greater than Vdd then transistor 40 shuts off the currents path from Vc to any other node, since it's gate is connected to Vc (highest voltage in the path) when off. If Vc is less than Vdd or when it's not present then transistor 60 shuts off that path since its gate is connected to the supply which is always present. Transistors 62 and 42 are operated in the same manner.

Figure 3:
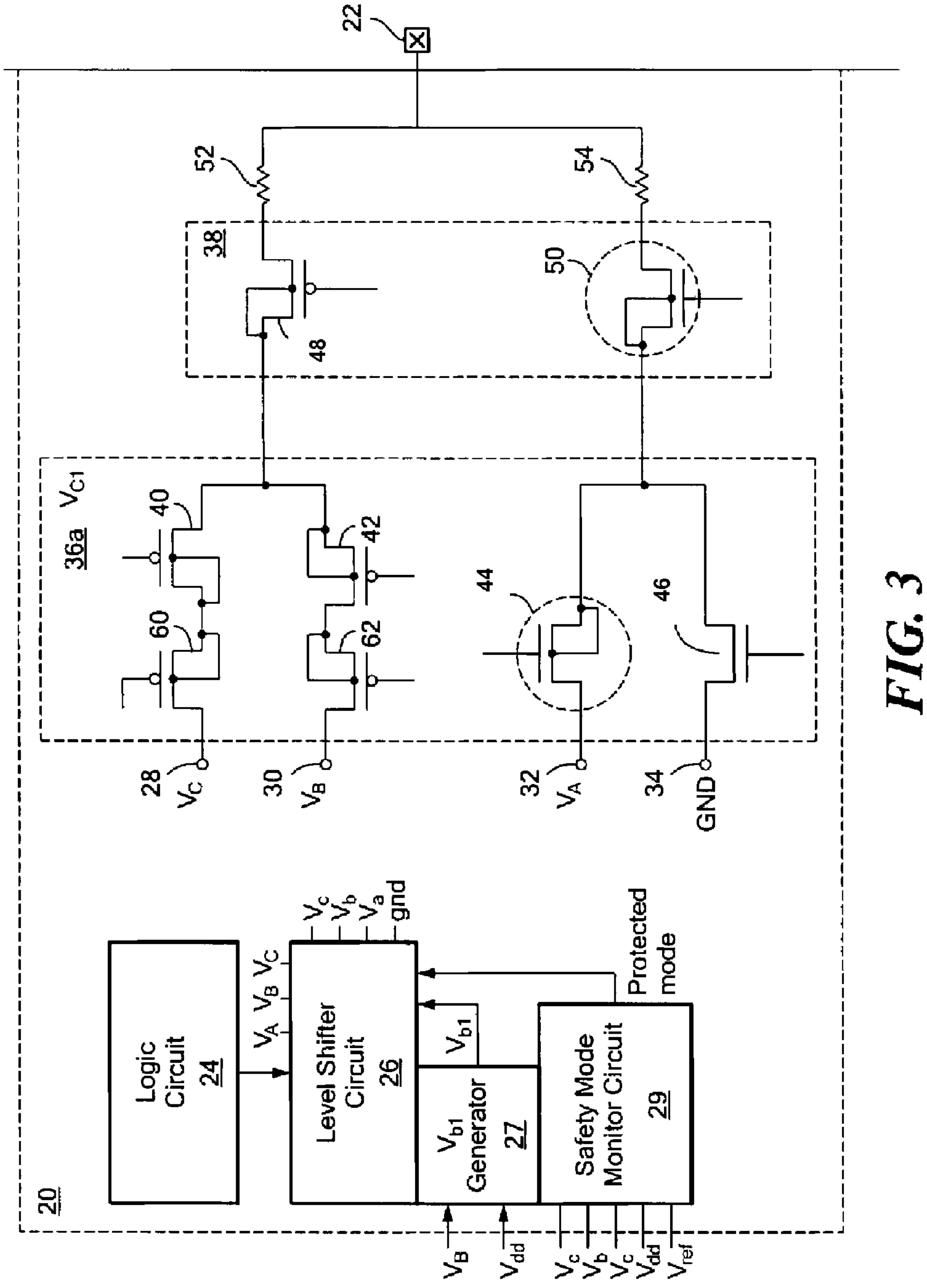
FIG. 3 is a more detailed schematic diagram of another embodiment of the LCD driver of FIG. 1.

This is shown in the last two columns, the $7^{th}$ and $8^{th}$ columns of Table I, which are labeled at the top, 60, 62, the reference numerals of those transistors in FIG. 3.

Figure 4:
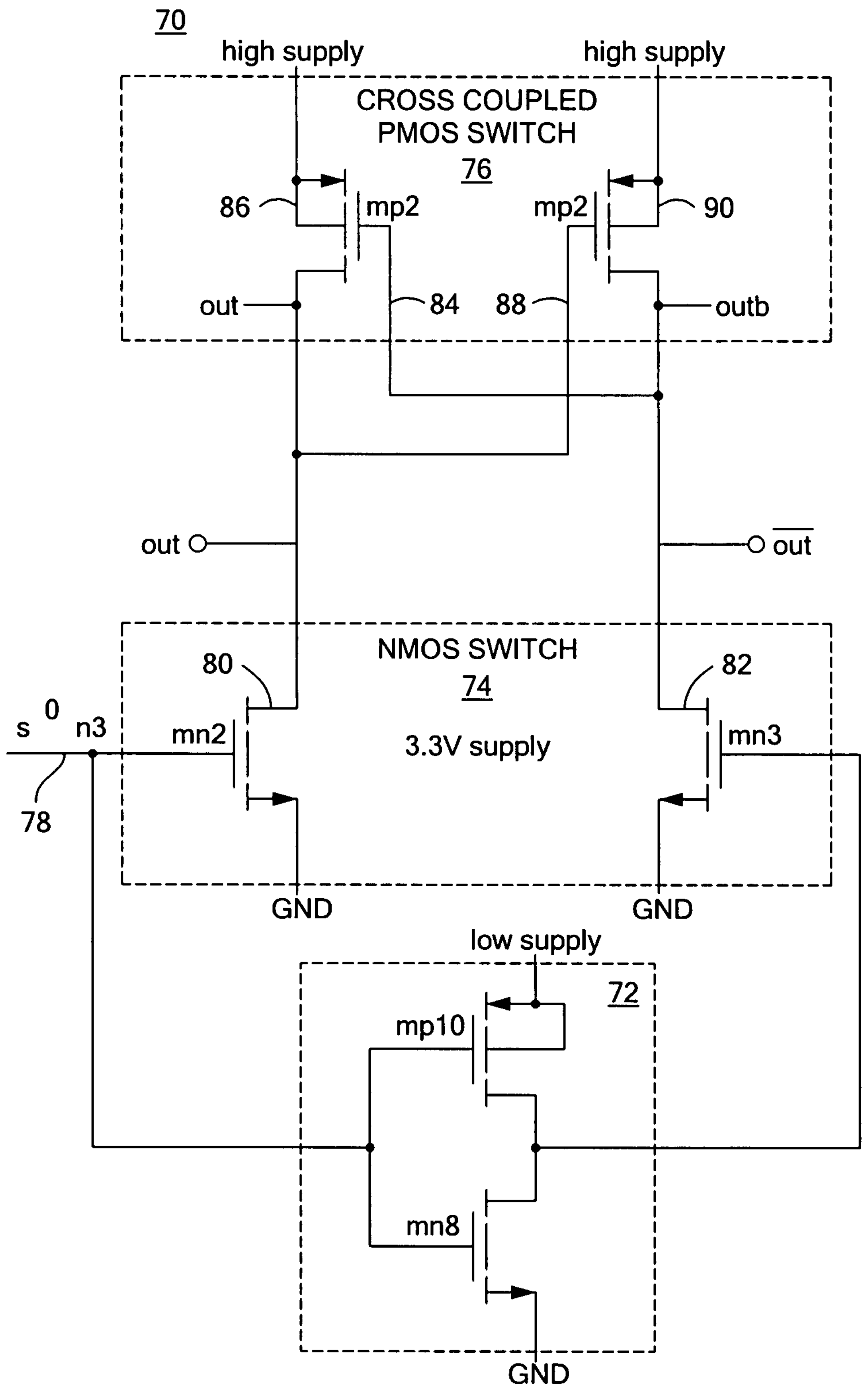
FIG. 4 is a schematic diagram of a prior art level shifter.

A typical prior art level shifter, which could be used in level shifter circuit 26 of FIG. 3 is shown as level shifter 70 in FIG. 4, where it is shown as including inverter 72, NMOS switch 74, and cross-coupled PMOS switch 76. In operation with a ground at input 78, transistor 80 is off, the ground at the input to inverter 72 becomes a high at the output and therefore turns on transistor 82. With transistor 82 on, ground is applied to the output and to the gate 84 of transistor 86. This action, employing the voltages previously suggested, would put 6 volts across the source to gate junction and destroy transistor 86. Likewise with a high level at input 78 inverter would provide a lower, off, signal to transistor 82, but transistor 80 would conduct, thereby bringing ground to the gate 88 of transistor 90. This would place 6 volts across the source to gate of transistor 90 and would exceed its breakdown voltage.

Figure 5:
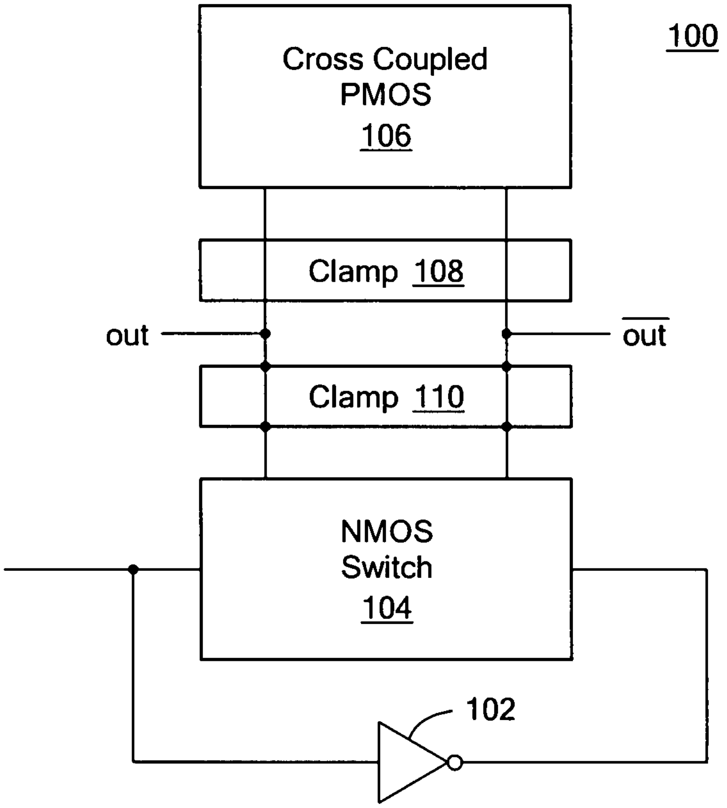
FIG. 5 is a schematic block diagram of a level shifter according to this invention.
Figure 6:
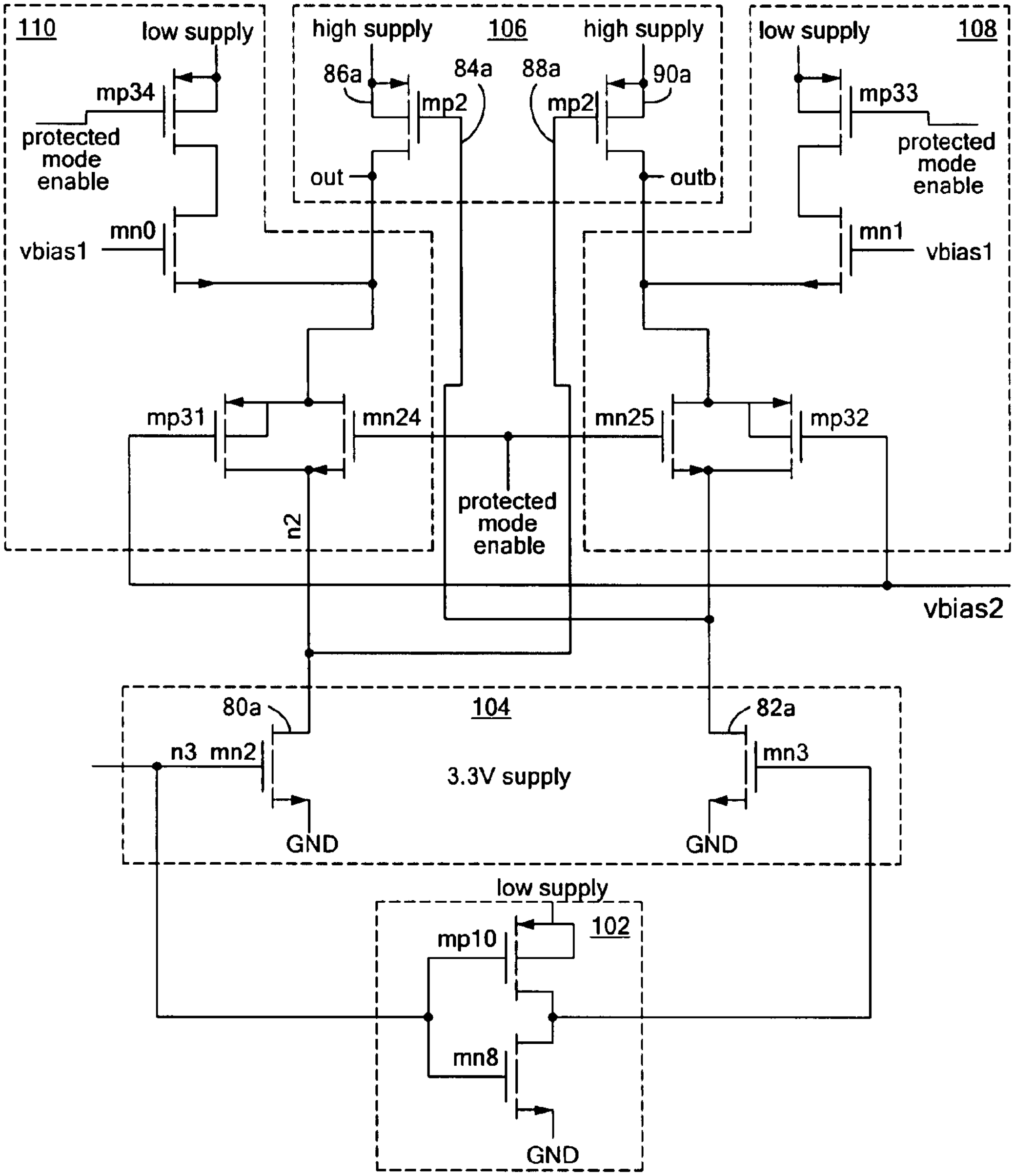
FIG. 6 is a schematic diagram of the level shifter of FIG. 5.

Thus, as shown in FIG. 5 a level shifter 100 according to this invention may include an inverter 102, NMOS switch 104 and a cross-coupled PMOS switch 106. The same principle applies in an opposite configuration i.e. using NMOS as the cross coupled configuration and the PMOS as switches. But it also includes a pair of clamps 108 and 110 which may be active clamps, clamp the gates 84*a*, 88*a*, FIG. 6, of the PMOS cross-coupled switch 106, FIG. 6, so that instead of going to ground in each case the gate is pulled down to a lower level but within 4 volts or less of the 6 volt Vc so that the breakdown voltage is not exceeded. Thus, transistors never see a voltage across the gate-source or gate-drain more than a predetermined value. In the protected mode these clamps are turned on while in the unprotected mode these are turned off and the level shifter acts like a normal cross coupled level shifter. While in this disclosed embodiment both in FIGS. 3 and 4 the higher voltage levels $V_C$, $V_B$ transistors switches were implemented with PMOS transistors and the lower voltage GND and VA were implemented with NMOS transistors, this is not a necessary limitation of the invention for the implementation could be reversed with the suitable adjustments made to the voltages applied.

The LCD driver also has a safety mode monitor circuit 29 such that if there is an external short or if the supply or reference voltage, Vref, or the clock goes away then the transistors are all on by default such that the high voltage nodes have a discharge path-to ground. The level shifter circuits block 26 controls the gate voltages to the transistors in this mode.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A low voltage driver comprising:

a plurality of input terminals for respective bias voltages; an output terminal;

an input transistor switching circuit having at least an input transistor for each bias voltage, each input transistor coupled on a first side to a respective input terminal and on a second side to a common node shared with at least one other input transistor;

an output transistor switching circuit, responsive to said input transistor switching circuit having a plurality of output transistors, each output transistor coupled on a first side to the output terminal and on a second side to a respective common node of the input transistors;

a level shifter providing a set of switching voltages to the plurality of input and output transistors;

a logic circuit applying the set of switching voltages to said input and output transistor switches to connect a selected one of said bias voltages to said output terminal; and a safety mode monitor circuit that when a selected bias voltage has a magnitude that exceeds a breakdown voltage of the input and output transistor switches that couple the selected bias voltage to the output terminal, signals the level shifter to adjust switching voltages to coupled transistors based on the selected bias voltage, and selectively enables at least one input transistor coupled to a non-selected bias voltage to a common node that couple a non-selected output transistor to the output terminal.

2. The low voltage driver for a higher voltage LCD of claim 1 in which said level shifter includes a PMOS switch, an NMOS switch and a claim circuit for clamping the PMOS switch gates above ground.

3. The low voltage driver for a higher voltage LCD of claim 2 in which said claim circuit is an active clamp.

4. The low voltage driver for a higher voltage LCD of claim 2 in which said PMOS switch is cross coupled to said NMOS switch.

5. The low voltage driver for a higher voltage LCD of claim 1 in which said input transistor switching circuit includes at least a first input transistor for each bias voltage input terminal.

6. The low voltage driver for a higher voltage LCD of claim 5 in which said output transistor switching circuit includes at least a first output transistor for each pair of said first input transistors.

7. The low voltage driver for a higher voltage LCD of claim 5 in which at least a first pair of first input transistors are PMOS transistors and there is a blocking transistor in series with each of said first input PMOS transistors for enabling start-up with said bias voltages below preset voltage.

8. The low voltage driver for a higher voltage LCD of claim 1 in which said switching voltages are approximately equal to said bias voltages.

9. The low voltage driver for a higher voltage LCD of claim 1, wherein a first transistor of the input transistor switching circuit coupled to the non-selected bias voltage is turned on to provide the non-selected bias voltage to a common node shared with a second transistor of the output transistor switching circuit, the second transistor is connected between the common node and the output terminal and is turned off.

10. The low voltage driver of claim 1, wherein, in the protected mode, the set of switching voltages are adjusted to selectively enable at least one input transistor coupled to the non-selected bias voltage to raise a voltage level of a respective common node to the non-selected bias voltage.

11. A method of generating a high voltage output using a low voltage driver comprising:

applying a plurality of input bias voltages to a plurality of input terminals, respectively;

applying a set of switching voltages to a plurality of input and output transistors to select one input bias voltage to output from an output terminal, wherein each input transistor is coupled on a first side to a respective input terminal and on a second side to a common node shared with at least one other input transistor, and each output transistor is coupled on a first side to the output terminal and on a second side to a respective common node of the input transistors, and wherein when the difference between the two input bias voltages is larger than the predetermined threshold value, entering a protected mode and adjust the set of switching voltages; and monitoring a selected bias voltage such that when a magnitude exceeds a breakdown voltage of the input and output transistor switches that couple the selected bias voltage to the output terminal signals a level shifter to adjust switching voltages to the coupling transistors based on the selected bias voltage, and selectively enables at least one input transistor coupled to a non-selected bias voltage to a common node that couple a non-selected output transistor to the output terminal.

12. The low voltage driver of claim 11, wherein, in the protected mode, the set of switching voltages are adjusted to selectively enable at least one input transistor coupled to the non-selected bias voltage to raise a voltage level of a respective common node to the non-selected bias voltage.

13. A voltage driver, comprising:

a switch network connecting a plurality of input terminals to a common output terminal, the switch network defining a plurality of selectively conductive paths according to a tree hierarchy, the switch network comprising:

an input stage having switches provided for each of a number of bias voltages, wherein each switch is coupled on a first side to the respective bias voltage and is coupled on a second side to a common node connected to at least one other switch of the input stage, and an output stage having a plurality of switches coupled on a first side to the output terminal and on a second side to a common node from a preceding stage;

a level shifter providing a set of switching voltages;
a controller to:
responsive to a selection of one of the bias voltage, cause the switch network to render conductive all switches in a selected path between the input terminal of the selected bias voltage and the output terminal, and
for a non-selected switch that is not part of the selected path but is coupled to a node that carries the selected bias voltage, when the selected bias voltage exceeds a breakdown voltage of the non-selected switch, cause the level shifter to apply a voltage to a control input of the non-selected switch that is within a breakdown tolerance of the selected bias voltage.

* * * * *